(12) United States Patent
Russell et al.

(10) Patent No.: US 6,978,939 B2
(45) Date of Patent: Dec. 27, 2005

(54) PORTABLE IMAGING DEVICE ACCESSORY FOR A PERSONAL DATA ASSISTANT

(75) Inventors: Paul Grady Russell, Campbell, CA (US); Jerry Ortkiese, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/393,298

(22) Filed: Mar. 19, 2003

(65) Prior Publication Data

US 2004/0182935 A1     Sep. 23, 2004

(51) Int. Cl.[7] .............................................. G06K 7/10
(52) U.S. Cl. ................... 235/472.01; 235/375
(58) Field of Search ............................ 235/380, 382.5, 235/375, 487, 472.01; 382/100; 283/74, 283/75

(56) References Cited

U.S. PATENT DOCUMENTS

| | | | |
|---|---|---|---|
| 5,604,640 A | | 2/1997 | Zipf et al. |
| 5,936,609 A | * | 8/1999 | Matsuoka et al. ........... 345/156 |
| 5,999,666 A | | 12/1999 | Gobeli et al. |
| 6,061,478 A | * | 5/2000 | Kanoh et al. ................ 382/305 |
| 6,064,779 A | | 5/2000 | Neukermans et al. |
| 6,095,418 A | * | 8/2000 | Swartz et al. ........... 235/462.01 |
| 6,297,491 B1 | | 10/2001 | Mangerson |
| 6,334,030 B1 | | 12/2001 | Mizumo et al. |
| 6,412,689 B1 | * | 7/2002 | Horiguchi et al. ........... 235/375 |
| 6,427,078 B1 | * | 7/2002 | Wilska et al. ............. 455/550.1 |
| 6,488,205 B1 | * | 12/2002 | Jacobson ..................... 235/380 |
| 6,504,138 B1 | * | 1/2003 | Mangerson .............. 250/208.1 |
| 6,513,710 B1 | * | 2/2003 | Haas ........................... 235/380 |
| 6,654,768 B2 | * | 11/2003 | Celik ....................... 707/104.1 |
| 6,681,028 B2 | * | 1/2004 | Rodriguez et al. .......... 382/100 |
| 2002/0067520 A1 | * | 6/2002 | Brown et al. ................ 358/906 |
| 2004/0093444 A1 | * | 5/2004 | Liao ............................. 710/62 |

* cited by examiner

Primary Examiner—Ahshik Kim

(57) ABSTRACT

A method and apparatus for providing a portable imaging device configured to associate information from a business card with a digital picture image. The portable imaging device includes a casing having a business card receptacle configured to receive a business card therein. The portable electronic device also includes a digital camera portion and a scanner portion. The scanner portion is housed within the casing and configured to extract personal information from the business card received in the business card receptacle. The digital camera portion is coupled to the casing and is configured to digitally capture a picture image. The scanner portion and the digital camera portion are operatively coupled to memory storage. The memory storage is operable to save the picture image with the personal information to provide an association therebetween.

37 Claims, 7 Drawing Sheets

PORTABLE IMAGING DEVICE ACCESSORY FOR A PERSONAL DATA ASSISTANT

BACKGROUND OF THE INVENTION

1. Field of the Invention

The present invention relates generally to portable electronic devices. More particularly, the present invention relates to a portable imaging device accessory for a personal data assistant.

2. Background of the Invention

People generally have a difficult time remembering intangible things such as dates, numbers and names. They tend to do better at making memory associations having visual components. For example, it may be easier to recall the details from a scene in a movie than the title of the movie. Many popular memory techniques take advantage of this by teaching students to associate those things they find difficult to remember, such as names and numbers, with a visual image. By doing this, the intangible thing is made visual, thus rendering it easier to remember.

This memory problem is nowhere more apparent than in face-to-name recognition. It is a general problem for people when they see an individual they have just met or are only slightly acquainted with to remember their name. In many cases, details concerning the individual can be recalled but the name remains elusive. People tend to find it is easier to remember details about an individual when associated with their face than to remember those same details associated with the individual's name.

This is a tremendously important issue in business settings due to the critical nature of establishing new contacts with individuals in related areas of business. These contacts bring new opportunities to strengthen a business and allow it to thrive. When a business individual meets a potential contact for the first time, impressions are made which are generally associated with the face of the contact, not the contact's name. The contact will usually then present the individual with a business card, containing information concerning the name, address and phone number of the contact. But many people have a difficult time associating the face and the first impression with the name on the card. In large professional meetings where literally hundreds of contacts can be made, this task becomes impossible. In these situations, opportunities from excellent contacts can be lost amongst the mediocre ones due to sheer volume.

Additionally, people tend to react negatively when their name and other details about them are not remembered by others. In a business setting, a bad impression can be generated by forgetting a contact's name, thus decreasing the potential opportunity derived from the association to the business. On the other hand, a positive reaction from a contact can greatly increase the probability of a successful interaction.

SUMMARY OF THE INVENTION

The present invention relates to a method and apparatus for providing a portable imaging device configured to associate information from a business card with a digital picture image. The portable imaging device includes a casing having a business card receptacle configured to receive a business card therein. The portable imaging device also includes a digital camera portion and a scanner portion. The scanner portion is housed within the casing and configured to extract personal information from the business card received in the business card receptacle. The digital camera portion is coupled to the casing and is configured to digitally capture a picture image. The scanner portion and the digital camera portion are operatively coupled to memory storage. The memory storage is operable to save the picture image with the personal information to provide an association therebetween.

DETAILED DESCRIPTION

Figure 1:
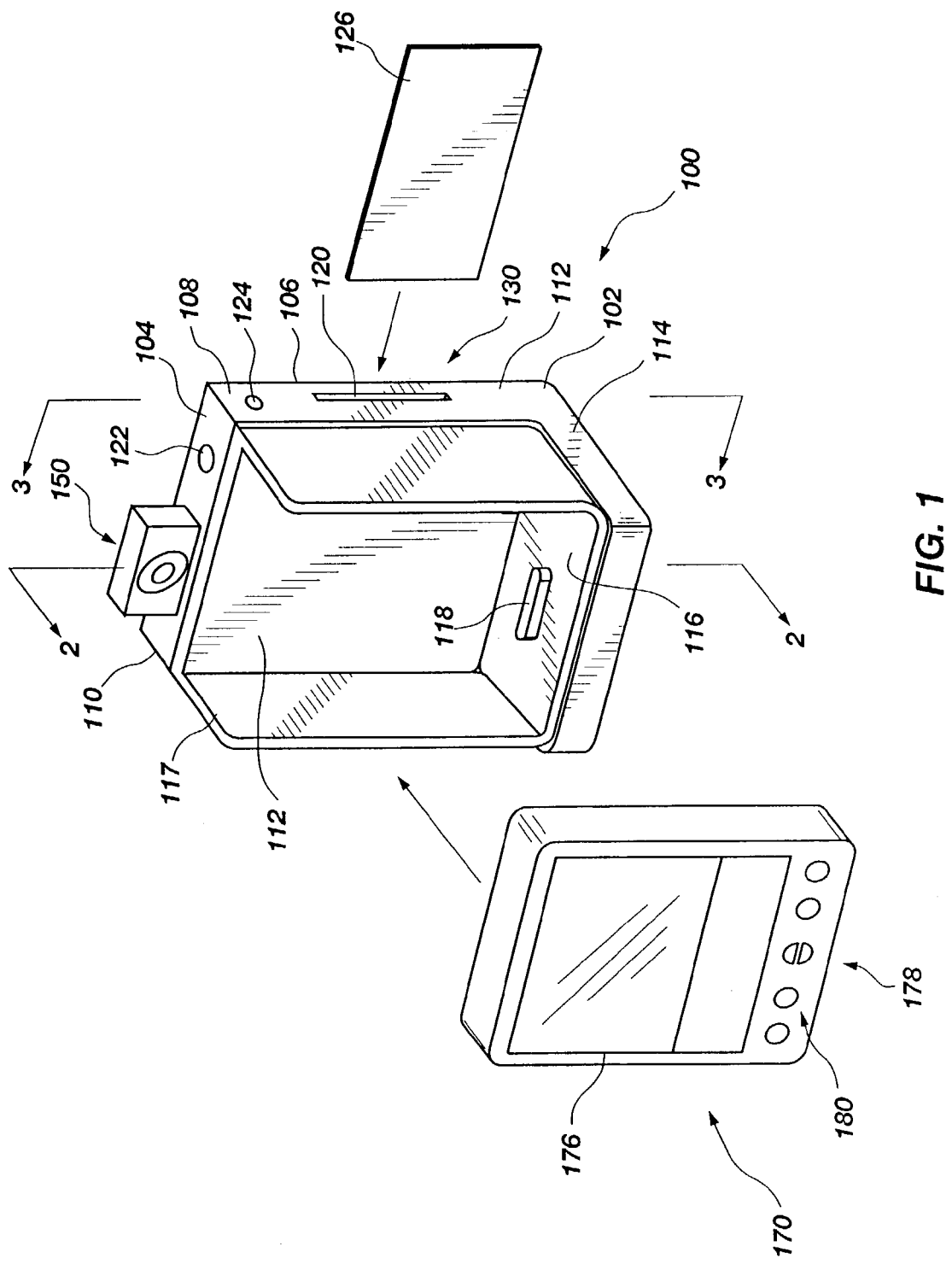
FIG. 1 illustrates a simplified, perspective view of an embodiment of a portable imaging device and a personal data assistant disengaged from each other.
Figure 1A:
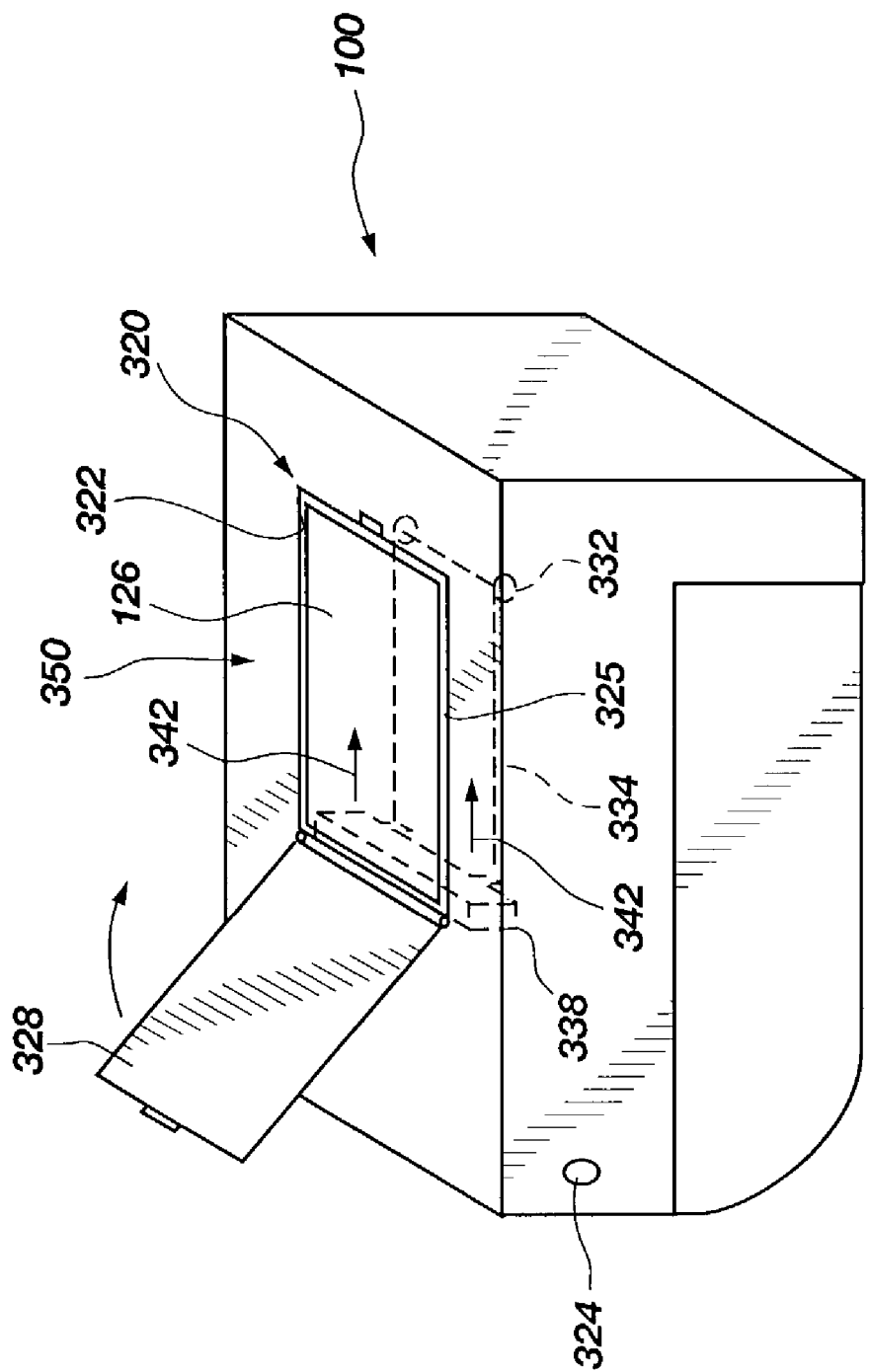
FIG. 1(a) illustrates a simplified, perspective view of another embodiment of the portable imaging device.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

FIG. 1 illustrates a perspective view of an embodiment of the portable imaging device 100, in which the device 100 is disengaged from a personal data assistant ("PDA") 170. PDA's are well known in the portable electronic arts. The PDA 170 used in conjunction with the portable imaging device 100 can be any suitable, hand held, battery powered information handling system such as an electronic address book or personal digital assistant. The exterior of the PDA 170 typically includes a display 176, PDA terminals 178 and various user input controls 180. The display 176 is typically a touch-sensitive display, which can be a color display or mono-chrome display, but can be any type of display suitable for displaying information, still images, and real-time field-of-view images. The input controls 180 can be input buttons to input commands functioning with a user interface viewable on the display 176 of the PDA 170. It is also typical for the input controls 180 to be integrated with the touch-sensitive display 176 so the user inputs commands by directly depressing points in the display 176 with, for example, a wand. The PDA terminals 176 are generally configured for downloading and uploading data therethrough and powering a battery in the PDA 170. Such battery in the PDA 170 can be utilized to power an accessory device through the PDA terminals, such as the portable imaging device 100.

The portable imaging device 100 is configured to interconnect and electrically communicate with the PDA 170. Such a portable imaging device 100 is configured to include a scanner portion 130 and a digital cameral portion 150. The scanner portion provides a business card receptacle, in which a business card can be scanned to provide a scanned image. The scanned image of the business card can then be transferred and viewed on the PDA 170. The digital camera portion is configured to digitally capture a picture image, which can also be viewed on the PDA.

The small, compact and portable nature of the device 100 enables the user to readily have the device 100 on demand along with the PDA 170. Such a device 100 can be useful in a business type setting. For example, a user can, upon meeting a potential business contact, or the like, take the business contact's business card and scan the card in the device. The user can also take the business contact's picture image. Each of the scanned image of the card and the picture image can be viewable on the display of the PDA 170 and then maintained together in the PDA 170. In this manner, the portable imaging device provides the user with a means to facilitate the user's memory association of the business contact's face with their name and business information from their business card. Such can provide a favorable impression with the potential business contact and, more importantly, enhances the ability of the user to remember who the business contact is in association with their contact information from the business card for future reference. This can be a tremendous help when faced with numerous potential business contacts and their business cards when attending, for example, a convention or conference, or the like.

The portable imaging device includes a casing 102 with the scanner portion 130 formed therein. The digital camera portion 150 can also be formed within the casing 102, however, it is also contemplated that the digital camera portion 150 can be electrically and physically attachable to the casing 102. The casing 102 can be generally L-shaped with a top side 104, a front side 106, a first side surface 108, a second side surface 110, a back side 112 and a base 114. The base 114 and the back side 112 can include a cradle portion 116 configured to support the PDA 170. The cradle portion 116 can include side rails 117, continuing from the first and second side surfaces 108 and 110 and extending outward from the back side 112 of the casing 102. The cradle portion 116 also includes connection terminals 118 configured to interconnect with the PDA terminals 178 formed in the PDA 170. The portable imaging device can be activated by depressing an activation switch 122, which is shown to be located on the top side 104 of the casing, but can be located at any suitable portion of the casing. The casing 102 can be made from a polymeric type material, or any other suitable type material. The material employed for the casing 102 can be made to substantially protect the device 100 from, for example, accidental drops or thermal type stresses.

The casing 102 also includes a business card receptor 120 sized and configured to receive a business card 126. For example, a standard business card is about two inches wide. As such, the business card receptor opening can be slightly wider than the standard sized business card. However, the size of the opening can vary depending on the standard size of business cards in its area of use. The business card receptor 120 can be defined as a slot extending through the casing 102 and configured to extend from the first side surface 108 to the second side surface 110. It is also contemplated that the slot can be configured to extend partially into the casing from a single surface of the casing 102. In another embodiment, the business card receptor 120 can include a slot extending between the base 114 and the top side 104 of the casing 102.

FIG. 1(*a*) illustrates another embodiment of a business card receptor 320 defined in the portable imaging device 100. In this embodiment, the business card receptor 320 can be configured as a recess 322 defined in the front side 306 of the portable imaging device 100. The recess 322 can include a substantially planar and transparent surface 325 configured to receive and position the business card 326 face down thereon. As such, the transparent surface 325 defined in the recess 322 can be sized slightly larger than the dimensions of the standard sized business card. The business card receptor 320 can also include a flap 328 configured to enclose the recess 322 and cover the back side of the business card 326.

Figure 2:
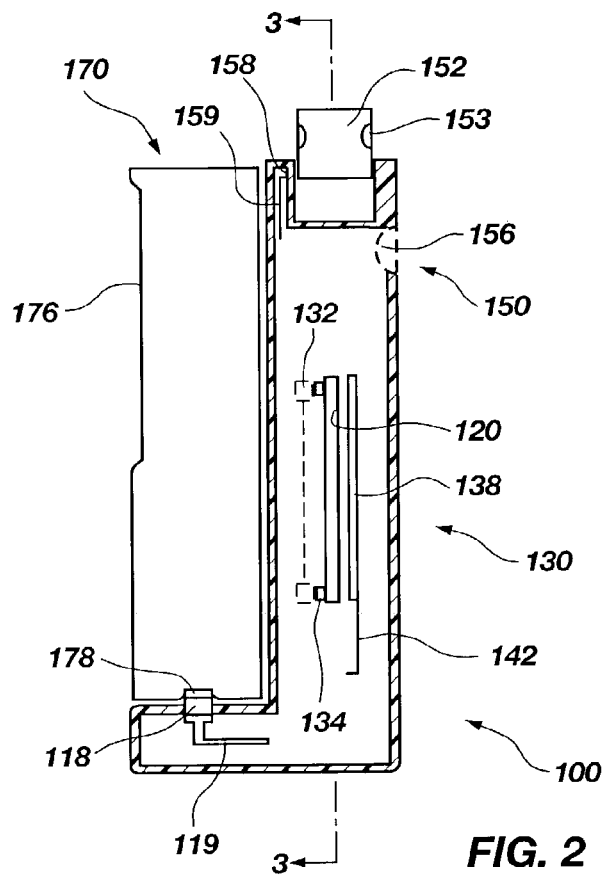
FIG. 2 illustrates a simplified, cross-sectional view of the portable imaging device engaged with the personal data assistant taken along line 2—2 in FIG. 1.
Figure 3:
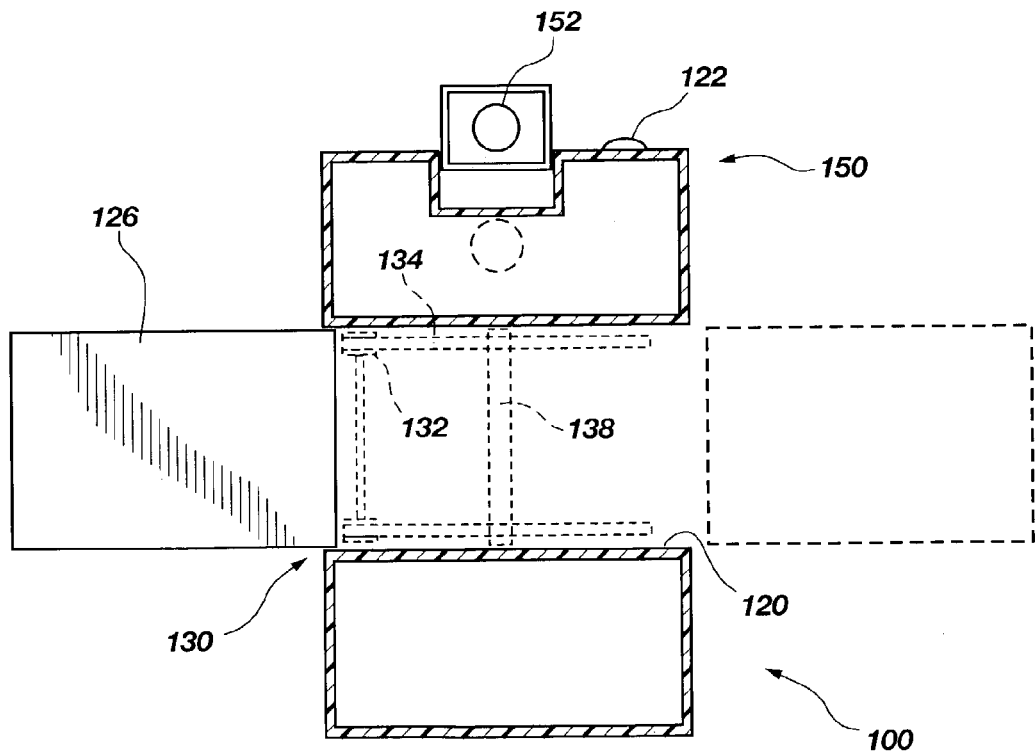
FIG. 3 illustrates a simplified, cross-sectional view of the portable imaging device engaged with the personal data assistant taken along line 3—3 in FIG. 1, depicting a business card entering a business card receptacle and the business card extracted from the business card receptacle shown in outline.

With reference to FIGS. 2 and 3, simplified cross-sectional views of the portable imaging device 100 taken along lines 2 and 3, respectively, in FIG. 1 with the PDA 170 positioned in the cradle portion 116 are illustrated. As depicted, the connection terminals 118 of the portable imaging device 100 are in direct contact and are configured to correspond with the PDA terminals 178 of the PDA 170. The connection terminals 118 include line conductors 119 extending therefrom to various components in the portable imaging device 100. It is through the connection terminals 118 and PDA terminals 178 that the respective portable imaging device 100 and PDA 170 can electrically communicate and transfer data, including information and various types of images. Likewise, the portable imaging device 100 can be powered by the PDA 170 through the connection terminals 118. The portable imaging device 100 can be powered from its own battery, which can be chargeable through the connection terminals 118.

As previously indicated, the portable imaging device includes a scanner portion 130. The scanner portion 130 can include a drive unit 132 coupled with a belt member 134. The drive unit 132 is configured to drive the belt member 134. The drive unit 132 and belt member 134, in combination, are configured to move and position the business card 126 within the casing 102 to a pre-scan position as well as move the business card 126 through the casing 102 for scanning and extracting the business card 126 from the business card 126 receptacle 120. The belt member 134 can include two belts which can be positioned in the casing 102 to extend adjacently and at least partially along longitudinal sides of the business card receptacle 120. With this arrangement, at least portions of the belt member 134 can be in contact with a portion of a surface of the business card 126 to control and manipulate the card through the business card receptacle 120.

When inserting the business card 126 into the business card receptacle 120, a paper sensor switch (not shown) senses entry of the business card 126, which then activates the drive unit 132. The drive unit 132, via the belt member 134, then moves the business card 126 into a pre-scan position. Once in such pre-scan position, a scanner indication light 124 (FIG. 1) can indicate to a user that the business card 126 is in the pre-scan position and can be prompted to scan the business card. Once prompted to scan, the business card 126 can then be moved through the casing 102 over an imaging capture head 138. The imaging capture head 138 can be configured to scan the business card to extract a scanned image (not shown) from the business card 126. Once the scanning is complete, the business card 126 is extracted from the business card receptacle 120. The imaging capture head 138 transfers the scanned image through conductive lines 142 and line conductors 119 to the PDA 170, at which, the scanned information can be viewed on the display 176 of the PDA 170.

The term scanned image should be broadly interpreted to include scanned information that can be extracted from the business card via the imaging capture head in the form of a graphical image of the business card and or a text image. Such a text image can be obtained through, for example, an optical character recognition process. In this manner, the scanned image can be viewable on the display of the PDA and saved as an image file or a text file. In either case, scanning technology is well known and can be implemented by one of ordinary skill in the art.

Referring back to FIG. 1(*a*), in another embodiment, the portable imaging device 100 includes the scanner portion 350 with the transparent surface 325, as previously described. In this embodiment, the scanner portion 350 includes an imaging capture head 338 disposed under the transparent surface 325. The imaging capture head 338 is coupled to a track member 334 and drive unit 332 configured to drive the imaging capture head 338. With this arrangement, the business card 326 can be positioned face down on the transparent surface 325. A paper sensor switch (not shown) can sense the business card 326 positioned on the transparent surface 325. Such sensing of the business card 326 can activate the scanner indication light 324, which provides a light to indicate to the user that the scanner portion 350 is ready to scan. Once ready to scan, the scanner portion 350 can be prompted to scan the business card 126, wherein the drive unit 332 moves the imaging capture head 338 along the track member 334 so that the imaging capture head 338 moves across the under-side surface of the transparent surface 325 and scans the business card 126 as indicated by arrows 342. Upon scanning the business card 126, the scanner portion 350 provides a scanned image (not shown), which is then transferred to the PDA for viewing on the display and is storable therein.

Referring back to FIGS. 2 and 3, the portable imaging device 100 also includes a digital camera portion 150. The digital camera portion is configured to operate in conjunction with the PDA 170. The digital camera portion 150 can be activated by depressing the activation switch 122. In one embodiment, the digital camera portion 150 can include a pop-up lens portion 152 with a lens 153 that can be movable upward when the portable imaging device 100 is activated. In another embodiment, the lens 156, shown in outline, of the digital camera portion 150 can be located on the front side 106 of the portable imaging device 100.

In either embodiment, the digital camera portion 150 is configured to digitally capture a digital image which can be translated and viewable on the PDA 170. Such digital image can be a real-time field-of-view image, which is electrically transferred through terminals 158 and conductive lines 159 to the PDA. At the PDA 170, the field-of-view image is viewable on the display 176. At any time with the field-of-view image displayed, the portable imaging device 100 can be oriented to a desirable position to take a digital still-photo to provide a picture image (not shown). Such picture image can be taken by depressing, for example, the activation switch 122. As digital camera technology is known, the digital camera portion 150 can readily be implemented by one of ordinary skill in the art.

Figure 4:
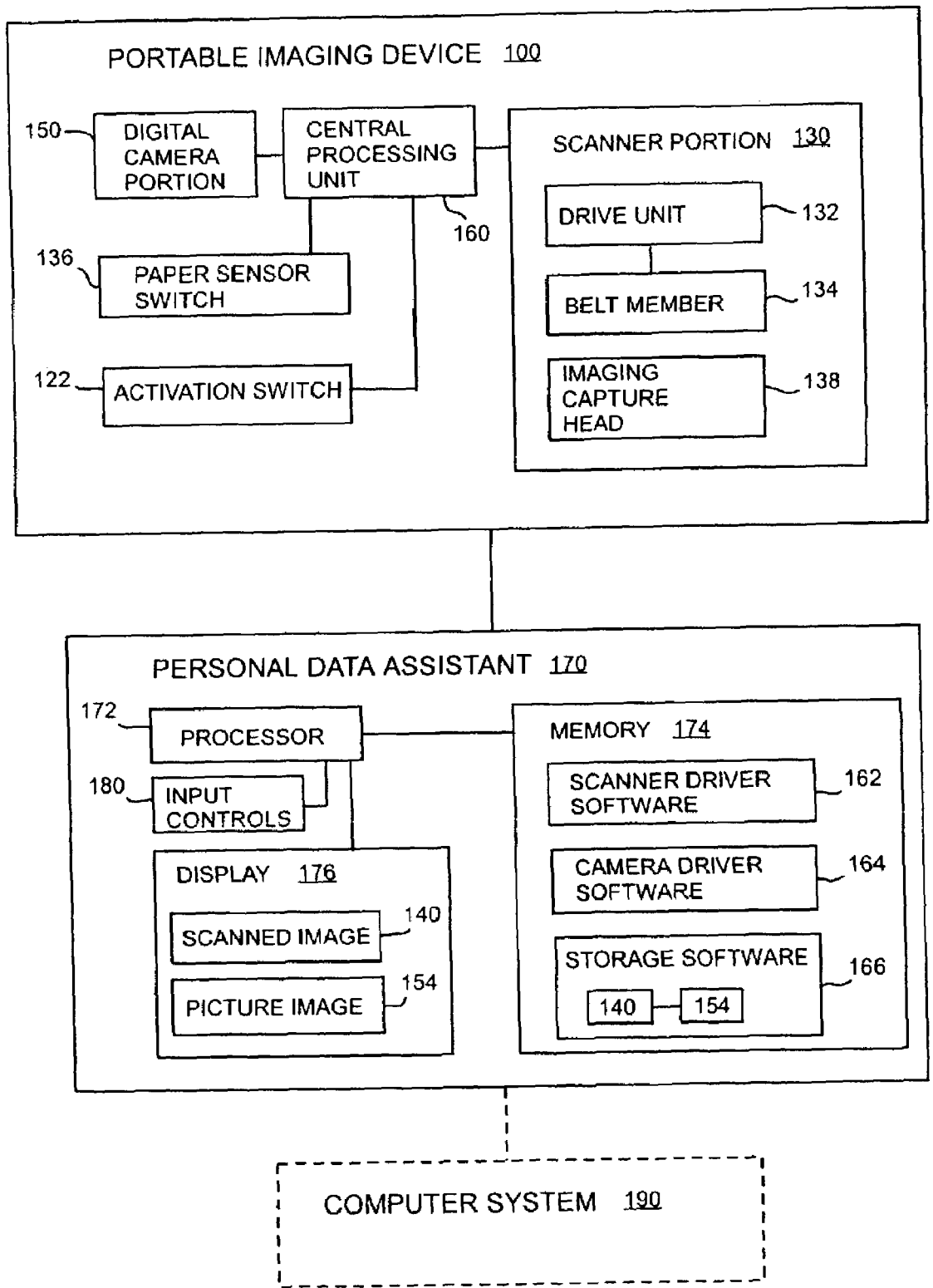
FIG. 4 illustrates a simplified schematic of an embodiment of the portable imaging device and the personal data assistant.
Figure 4A:
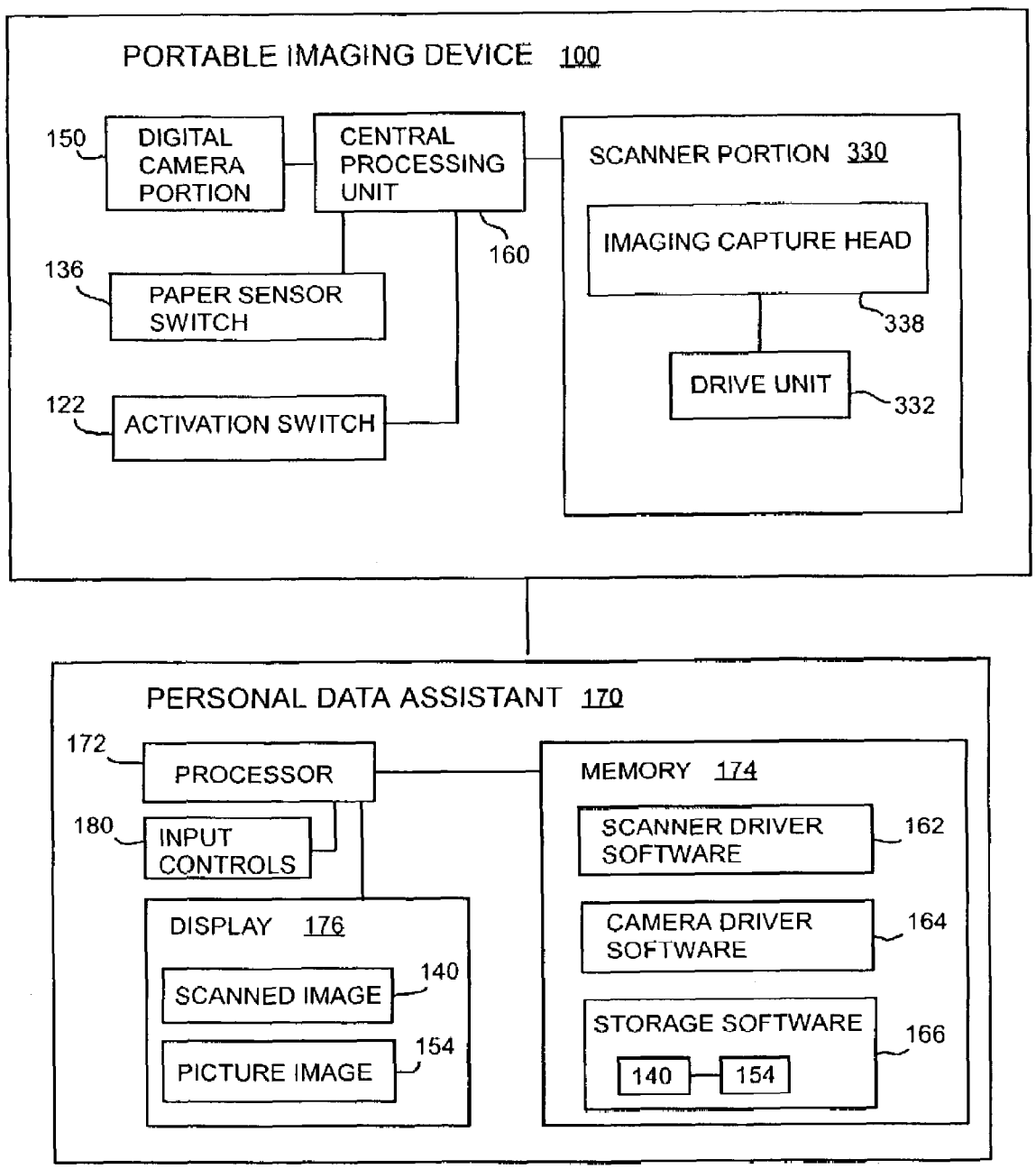
FIG. 4(a) illustrates a simplified schematic of the embodiment depicted in FIG. 1(a) of the portable imaging device and the personal data assistant.

Turning to FIG. 4, an embodiment of the portable imaging device 100 is illustrated in schematic form with the PDA 170. As indicated, the portable imaging device 100 includes, among other things, a central processing unit 160 electrically interconnected to the scanner portion 130 and the digital camera portion 150. The central processing unit 160 is also interconnected to the activation switch 122 and the paper sensor switch 136. The activation switch 122 can be configured to activate the digital camera portion 150 and the scanner portion 130 of the portable imaging device 100. The paper sensor switch 136 can be configured to sense a business card (not shown) to activate the drive unit 132, as previously described. The scanner portion 130 includes an imaging capture head 138 and a drive unit 132 coupled to a belt member 134.

The portable imaging device 100 is configured to be electrically interconnected to the personal data assistant 170. Such a personal data assistant 170 typically includes a processor 172, memory 174, the display 176 and the input controls 180. The memory 174 can include, among other things, scanner driver software, camera driver software, and storage software loaded therein. The scanner driver software 162 and the camera driver software 164 function to communicate and drive the scanner portion and the digital camera portion of the portable imaging device, respectively. Both the scanner driver software and the camera driver software provide a user interface through the display 176 of the PDA 170 to allow a user to input commands, via the input controls 180, to prompt the scanner portion and the digital camera portion.

As previously described, the scanned image of the business card can be obtained by running the business card across the imaging capture head 138 via the drive unit 132 and belt member 134. Such scanned image 140 can be transferred and viewed on the display 176 of the PDA 170. Likewise, the digital camera portion 150 is configured to digitally capture a picture image 154, which is viewable on the display 176 of the PDA 170. Once the user is satisfied with the scanned image 140 and picture image 154 viewable on the display 176, the user can save and maintain the scanned image 140 linked with the picture image 154 in the storage software 166 to maintain an association between the scanned image 140 and picture image 154. The scanned image 140 and the picture image 154 can then be readily retrievable from the storage software 166 and viewable together on the display 176 of the PDA 170. If desired, the scanned image 140 and the picture image 154 can be downloaded and saved to a personal computer system 190 for printing from the system 190 or maintaining on the system 190.

As previously indicated, the imaging capture head 138 can be configured to provide the scanned image 140 as information in the form of a graphical image or decodable with an optical character recognition process to be in the form of a text image. With this arrangement, the scanned image 140 can be saved as an image file or a text file in the PDA 170. It is also contemplated that the text image can be integrated with the picture image 154 so that the information from the text image overlies the picture image 154, thereby, being readily viewable together and saved together in a single file.

FIG. 4(*a*) illustrates an embodiment, in schematic form, of the portable imaging device 100 described previously in FIG. 1(*a*) with the PDA 170. With reference to FIGS. 1(*a*) and 4(*a*), this embodiment is substantially the same as that described in FIG. 4, except the scanner portion 350 includes an imaging capture head 338 that is movable and coupled to the drive unit 332. With this arrangement, the paper sensor switch 136 senses the business card positioned over the transparent surface 325 in the business card receptor 320. The paper sensor switch 136 then activates a light indicator 324, which indicates to the user that the scanner portion 350 is ready to scan. The user can then prompt the scanner portion 350 to scan through user input controls 180 via the scanner driver software 162 loaded on the PDA 170. The drive unit 332 then can be activated to move the imaging capture head 338 across the under-side of the transparent surface 325 to scan the business card 126 and provide a scanned image 140. The scanned image 140 can then be transferred and viewable on the PDA 170 as previously described.

Figure 5:
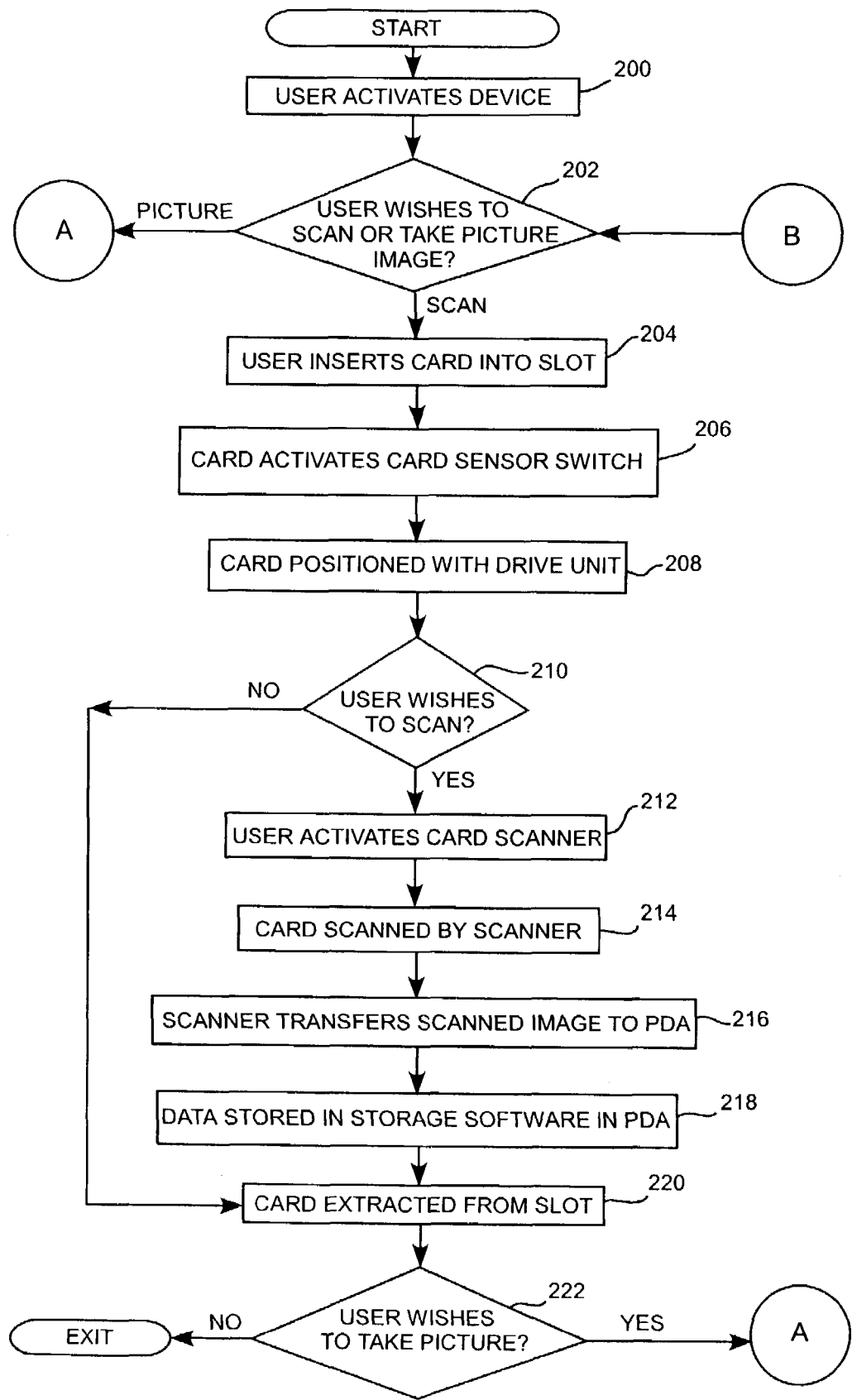
FIG. 5 illustrates, in flow chart form, an embodiment by which the portable imaging device can be implemented by a user.
Figure 6:
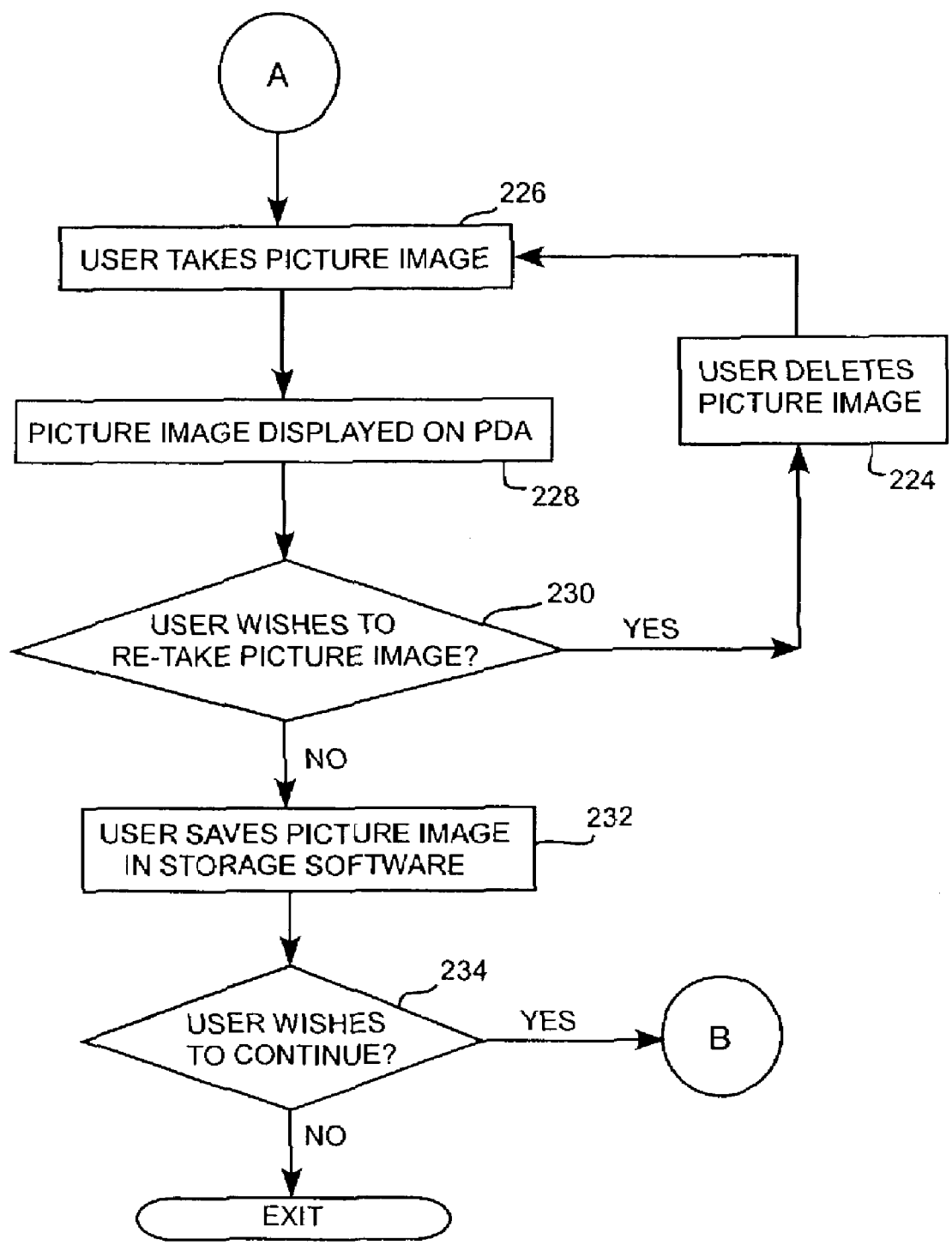
FIG. 6 illustrates, in flow chart form, a continuation of FIG. 5.

To better illustrate the functionality of the present invention, FIG. 5 illustrates a flow diagram of an embodiment by which the portable imaging device can be employed by a user in conjunction with the PDA. With reference to FIGS. 3, 4 and 5, as indicated by block 200, a user activates the portable imaging device 100 by depressing the activation switch 122. As indicated by user decision block 202, the user can either proceed to scan a business card or take a picture image. If the user chooses to take a picture image, the user proceeds to user decision block 226 (FIG. 6). If the user chooses to scan a business card 126, the user proceeds to block 204, where the user inserts a business card into the business card receptor 120 or slot. Upon entry of the business card 126 in the business card receptor 120, the card activates a paper sensor switch 136, as indicated in block 206. The paper sensor switch 136 then activates the drive unit 132 and belt member 134, which drives the business card 126 to a pre-scanning position, as indicated in block 208.

At this juncture, the user is prompted by a user interface of the scanner driver software 162 and/or by a scanner indication light 124 (FIG. 1) that the business card 126 is ready to scan. The user can choose whether or not to proceed and scan the business card 126, as indicated in user decision block 210. If the user chooses not to scan the business card, the user can prompt the scanner portion 130 to extract the business card with out scanning, as indicated in block 220. If the user chooses to scan the business card 126, the user can activate the scanner portion 130 through the user interface provided by the scanner driver software 162, as indicated in block 212. The drive unit 132 is then activated which drives the business card 126 via the drive belt 134 to thereby, move the business card 126 over the imaging capture head 138 which scans the business card 126 and provides a scanned image 140, as indicated in block 214. The scanner portion 130 then transfers the scanned image 140 to the PDA 170 which is viewable by the user on the display 176 of the PDA 170, as indicated in block 216. The scanned image 140 can then be saved and maintained in the storage software 166 in the memory 174 of the PDA 170, as indicated by block 218. As indicated in block 220, the card is extracted from the business card receptor 120.

At this juncture, the user can either proceed to take a picture with the digital camera portion or exit, as indicated in user decision block 222. In the case where the user chooses to exit, the user may have already taken a picture by proceeding to user decision block 226 from user decision block 202. In the case the user wishes to proceed in taking a picture, the user proceeds to user decision block 226 in FIG. 6.

With reference to FIGS. 3, 4 and 6, the user can take a picture image 154 as indicated in block 226. To take a picture, a real-time field-of-view image is displayed on the PDA from previously activating the portable imaging device 100 in block 200 (FIG. 5). As such, the user can orient the portable imaging device 100 to a desired position, as seen on the display displaying the field-of-view image, and depress, for example, the activation switch 122 to take a picture. A picture image 154 can then be displayed on the PDA 170, as indicated in block 228.

At this juncture, the user can examine the picture image 154 viewable on the display 176 of the PDA 170. As indicated in user decision block 230, the user can choose whether or not to retake the picture image 154. If the user wishes to retake the picture image 154, the user can delete the picture image 154, as indicated in block 224, and then proceed back to user decision block 226 and proceed as previously described from block 226. Once the user is satisfied with the picture image 154, the user can proceed to block 232 by saving the picture image 154 in the storage software 166 in the memory 174 of the PDA 170. If the user has already followed the flow path to have obtained the scanned image 140 of the business card 126, then the picture image 154 can be saved with the scanned image 140. As indicated in user decision block 234, the user can either proceed to user decision block 202 in FIG. 5 or the user can exit. In the case where the user proceeds to user decision block 202, the user can then choose to either take a picture or proceed to scan a business card 126 as previously described. In the case where the user proceeds to exit, the user has obtained the scanned image 140 and the picture image 154.

In this manner, the user can have a scanned image 140 of a business card 126 and a picture image 154 of the person who gave the user the business card 126 so that the picture image 154 and scanned image 140 are stored and maintained together in the PDA 170. With the scanned image 140 and picture image 154 maintained in the PDA 170, the user can readily retrieve the business contact's information and readily remember who the person is from the picture image 154 for future reference.

It is to be understood that the above-referenced arrangements are only illustrative of the application for the principles of the present invention. Numerous modifications and alternative arrangements can be devised without departing from the spirit and scope of the present invention. While the present invention has been shown in the drawings and fully described above with particularity and detail in connection with what is presently deemed to be the most practical and preferred embodiment(s) of the invention, it will be apparent to those of ordinary skill in the art that numerous modifications can be made without departing from the principles and concepts of the invention as set forth in the claims.

What is claimed is:

1. A portable imaging device configured to associate information from a business card with a digital picture image, the device comprising:

a casing having a business card receptacle configured to receive the business card therein;

a scanner portion housed within said casing and configured to extract personal information from the business card received in said receptacle;

a digital camera portion coupled to said casing and configured to digitally capture a picture image; and a memory storage, operatively coupled to said scanner portion and said digital camera portion, operable to save said picture image with said personal information to provide an association therebetween.

2. The portable imaging device of claim 1, wherein said business card receptacle comprises a slot defined in said casing.

3. The portable imaging device of claim 1, wherein said business card receptacle comprises a recess with a transparent surface defined in said casing.

4. The portable imaging device of claim 1, wherein said scanner portion comprises a drive unit configured to operatively move the business card through said casing for scanning the business card to extract the personal information therefrom.

5. The portable imaging device of claim 4, wherein said drive unit is coupled to a belt member configured to move the business card through the casing.

6. The portable imaging device of claim 1, wherein said scanner portion comprises an imaging capture head configured to scan the business card and provide a scanned image.

7. The portable imaging device of claim 6, wherein said imaging capture head scans said business card from a fixed position.

8. The portable imaging device of claim 6, wherein said imaging capture head is coupled to a drive unit.

9. The portable imaging device of claim 8, wherein said imaging capture head is configured to scan by moving over a surface of the business card via said drive unit.

10. The portable imaging device of claim 6, wherein said imaging capture head is operable to optically scan the business card and extract said personal information.

11. The portable imaging device of claim 1, wherein said casing includes both said digital camera portion and said scanner portion therein.

12. The portable imaging device of claim 1, wherein said casing comprises a central processing unit configured to be operable with said digital camera portion and said scanner portion.

13. The portable imaging device of claim 1, wherein said casing comprises a sensor switch configured to sense the business card in said business card receptacle.

14. The portable imaging device of claim 13, wherein said sensor switch is configured to trigger a drive unit operable to drive the business card through said casing.

15. The portable imaging device of claim 1, further comprising camera driver software, operatively coupled to said digital camera portion and loaded in said memory storage, operable to drive said digital camera portion.

16. The portable imaging device of claim 15, wherein said camera driver software is operable to provide a user interface to prompt said digital camera portion.

17. The portable imaging device of claim 1, further comprising scanner driver software, operatively coupled to said scanner portion and loaded in said memory storage, operable to drive said scanner portion.

18. The portable imaging device of claim 17, wherein said scanner driver software is operable to provide a user interface to prompt said scanner portion.

19. The portable imaging device of claim 1, wherein said casing comprises a cradle portion with connection terminals configured to electrically interconnect with an external electronic device having a display portion.

20. The portable imaging device of claim 19, wherein said external electronic device comprises a personal data assistant.

21. The portable imaging device of claim 19, wherein said external electronic device includes said memory storage.

22. The portable imaging device of claim 19, wherein said digital camera portion and said scanner portion are operatively interconnected to camera driver software and scanner driver software, respectively, loaded on said external electronic device.

23. The portable imaging device of claim 19, wherein said picture image from said digital camera portion is displayable on said display portion of said external electronic device.

24. The portable imaging device of claim 19, wherein said personal information extracted with said scanner portion is displayable on said display portion of said external electronic device.

25. The portable imaging device of claim 19, wherein said picture image and said personal information are displayable on said display portion of said external electronic device and storable together in said memory storage in said external electronic device.

26. A method of associating information from a business card with a digital picture image, the method comprising:
   electrically interconnecting a portable imaging device to a personal data assistant ("PDA"), said portable imaging device including a digital camera portion, a scanner portion and a business card receptacle, said digital camera portion and said scanner portion operatively coupled to memory storage in the PDA;
   capturing a picture image with said digital camera portion viewable on a display portion of the PDA;
   positioning a business card in a pre-scanning position in said business card receptacle of said portable imaging device;
   scanning said business card with said scanner portion to extract personal information from the business card viewable on the display portion of the PDA; and
   storing said picture image with said personal information in said memory storage in the PDA to provide an association therebetween.

27. The method of claim 26, wherein said positioning comprises inserting said business card in a slot defined in said portable imaging device.

28. The method of claim 26, wherein said positioning comprises disposing said business card in a recess defined with a transparent surface in said portable imaging device.

29. The method of claim 26, wherein said capturing comprises displaying said picture image on a camera driver software interface on the display portion of the PDA.

30. The method of claim 26, wherein said scanning comprises displaying said scanned image on a scanner driver software interface on the display portion of the PDA.

31. The method of claim 26, wherein said storing comprises prompting a user to save said picture image with said scanned image in storage software in the memory storage in the PDA.

32. The method of claim 26, wherein said scanning comprises moving the business card through said portable imaging device so that the business card moves over an imaging capture head.

33. The method of claim 26, wherein said scanning comprises moving an imaging capture head over a surface of the business card via a drive unit.

34. The method of claim 26, further comprising processing said picture image and said scanned image with a central processing unit operatively coupled to said digital camera portion and said scanner portion.

35. The method of claim 26, further comprising detecting the business card with a sensor switch, operatively coupled to said portable imaging device, operable to sense the business card in said business card receptacle.

36. The method of claim 35, wherein said detecting comprises subsequently prompting a user to trigger said scanner portion to scan the business card in said business card receptacle.

37. A portable imaging device having means for associating information from a business card with a digital picture image on a personal data assistant ("PDA"), the portable imaging device comprising:

digital photo means for capturing a digital picture image;
a business card receiving means configured to receive the business card therein;
scanning means for scanning the business card received in the business card receiving means to provide a scanned image; and
storing means, operatively coupled to said photo means and said scanning means, for storing said picture image with said scanned image in the PDA to provide an association therebetween.

* * * * *